United States Patent
Marom et al.

(10) Patent No.: US 10,142,161 B2
(45) Date of Patent: Nov. 27, 2018

(54) TECHNIQUES FOR DISTRIBUTION OF APPLICATION DELIVERY

(71) Applicant: RADWARE, LTD., Tel Aviv (IL)

(72) Inventors: Shy Marom, Ramat HaSharon (IL); Samuel Bercovici, Givatayim (IL); Benny Rochwerger, Zichron Yaakov (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 196 days.

(21) Appl. No.: 15/000,717

(22) Filed: Jan. 19, 2016

(65) Prior Publication Data

US 2017/0207947 A1 Jul. 20, 2017

(51) Int. Cl.
| G06F 15/16 | (2006.01) |
| H04L 12/24 | (2006.01) |
| H04L 29/06 | (2006.01) |
| H04L 29/08 | (2006.01) |

(52) U.S. Cl.
CPC ........ H04L 41/046 (2013.01); H04L 67/1002 (2013.01); H04L 67/32 (2013.01); H04L 67/42 (2013.01)

(58) Field of Classification Search
CPC . G06F 9/5027; G06F 9/5077; H04L 67/1023; H04L 67/1002; H04L 67/42
See application file for complete search history.

(56) References Cited

U.S. PATENT DOCUMENTS

| 8,213,336 B2 | 7/2012 | Smith et al. |
| 2010/0131636 A1 | 5/2010 | Suri et al. |
| 2012/0110185 A1 | 5/2012 | Ganesan et al. |
| 2013/0054817 A1* | 2/2013 | Moen ............... H04L 67/1014 709/227 |
| 2013/0080638 A1 | 3/2013 | Benedetto et al. |
| 2013/0268646 A1* | 10/2013 | Doron ............... H04L 67/1002 709/223 |
| 2014/0122743 A1 | 5/2014 | Benedetto et al. |
| 2014/0258541 A1 | 9/2014 | Benedetto et al. |
| 2014/0280499 A1 | 9/2014 | Basavaiah et al. |
| 2014/0282526 A1* | 9/2014 | Basavaiah ......... H04L 67/1002 718/1 |
| 2014/0310388 A1* | 10/2014 | Djukic ............... H04L 41/0816 709/221 |
| 2015/0149635 A1 | 5/2015 | Rajagopalan et al. |
| 2016/0269442 A1* | 9/2016 | Shieh ..................... H04L 63/20 |
| 2016/0301593 A1* | 10/2016 | Blair ....................... H04L 45/02 |
| 2016/0330076 A1* | 11/2016 | Tiwari ............... H04L 41/0806 |

* cited by examiner

Primary Examiner — Peling A Shaw
(74) Attorney, Agent, or Firm — M&B IP Analysts, LLC (57) ABSTRACT

A method, host machine, and a virtual network for distributing application delivery controller services in a virtual network are presented. The method includes activating a first application delivery controller (ADC) agent on at least a first host machine of a plurality of host machines included in the virtual network, wherein the first host machine is configured to host at least one client; intercepting, by the first ADC agent, a request from the at least one client, wherein the request is for a service provided by one server of a plurality of servers hosted by the plurality of host machines; selecting, by the first ADC agent, a server of the plurality of servers to serve the request; forwarding, by the first ADC agent, the intercepted request to the selected server; and relaying a response to the intercepted request received from the selected server to the at least one client.

39 Claims, 10 Drawing Sheets

TECHNIQUES FOR DISTRIBUTION OF APPLICATION DELIVERY

TECHNICAL FIELD

This disclosure generally relates to application delivery controllers (ADCs), and more specifically to distributing the operation of ADCs.

BACKGROUND

An application delivery controller (ADC) is a network device installed in a datacenter or multi-datacenter system to distribute load between servers in the datacenter. That is, an ADC typically distributes clients' requests between the servers in a datacenter to balance the load. The ADC is a network device and, as such, includes computing resources, such as memory, one or more central processing units (CPU), storage, network connectivity, and so on.

A virtual machine (VM) is a software implementation of a computer that executes programs like a physical machine. The virtualization technology decouples the hardware from software, thus allows sharing of the underlying physical hardware resources between different virtual machines, each running its own operating system (called guest operating system). Thus, the virtualization, which is typically performed by a hypervisor, allows multiple operating systems to run concurrently on a host computer. The hypervisor presents the guest operating systems with a virtual operating platform and monitors the execution of the guest operating systems. Further, the hypervisor defines the allocation of computing resources (e.g., CPU power, memory, network bandwidth, etc.) for each guest operating system.

Another technique for achieving software virtualization is by means of software containers (also known as container-based or operation system virtualization). Container-based virtualization is an approach to virtualization in which the virtualization layer runs as an application within the operating system. In this approach, the operating system's kernel runs on the hardware node with several isolated guests installed on top of it. The isolated guests are called containers.

Virtualization of an ADC device can simplify the network in the datacenters and reduce costs and overhead to the service providers. A disadvantage with the current virtualized ADC solution is that physical ADCs are designed to take and execute load balancing decisions in a physical location close to the servers, while a virtualized ADC may be placed anywhere on the virtual network. This deficiency less of a limitation when distributing north-south traffic (e.g., client-server traffic, where the client is connected to an external network), but can be a limitation in particular for handling east-west traffic direction. An east-west traffic direction refers to the case in which both clients and servers are virtual machines executed in the virtualized data center, on a virtual network. In the context of the data center, east-west traffic is the traffic that goes between servers in a given data center or between servers in different data centers. The virtualized ADC may reside anywhere in the data center and not necessarily be physically close to the server VMs. As a result, the current deployment and utilization of virtual ADCs in a cloud-based platform, datacenters, or software defined data centers is inefficient in the sense that it wastes network and compute resources. The limitations of the conventional solutions are further demonstrated in FIGS. 1, 2, 3, and 4.

Figure 1:
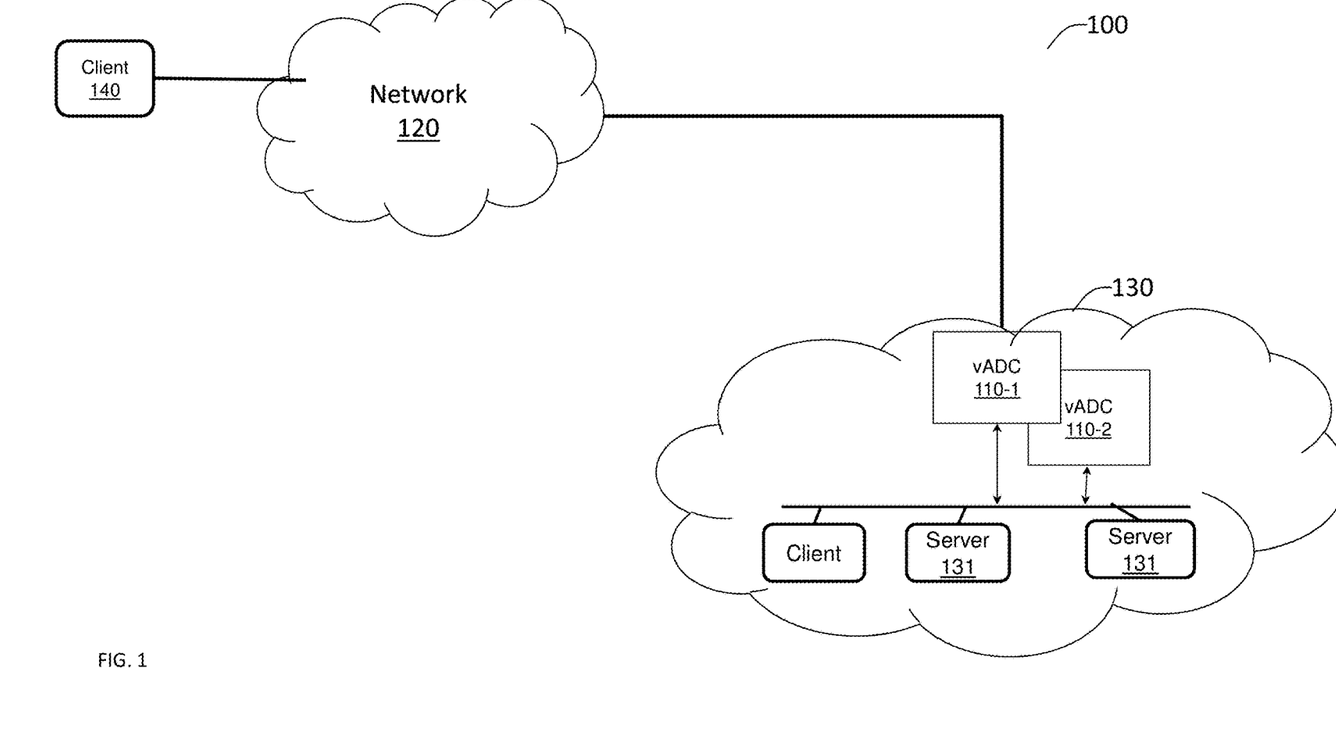
FIG. 1 is a conventional architecture of a cloud-based platform.

FIG. 1 shows an architecture of a cloud-based platform 100. Virtual ADC instances (vADC) 110-1 and 110-2 are deployed between an external network 120 and a virtual network 130. A virtual network can host one or more tenants. A "tenant" is a group of one or more virtual machines hosted in physical machines and provisioned to provide services to a particular customer based on, for example, a service-level agreement (SLA). The isolation and independence of VMs and virtual networks allow for creating "tenants" and for providing multi-tenancy support in a datacenter. An external network includes a WAN, a LAN, the Internet, an Internet service provider (ISP) backbone, a corporate network, and the like.

A vADC 110 is configured with a virtual IP (VIP) address and port. Any client that requests services from servers 131 sends the requests to the VIP address. For example, a request from a client 140, connected outside the datacenter via the network 120, is addressed to the VIP of one of the vADCs 110, which distributes the requests to one of the servers 131 in the virtual network 130.

Therefore, all requests to the servers 131 are directed through one of the vADCs 110, and responses from the servers 131 are sent through the vADC 110 to the client. That is, directing all traffic via a central entity causes data to travel across the network at least twice (for example, a server's response must travel to client via the ADC). This results in an inefficient packet flow traffic and increased latency.

Another limitation of the conversional deployment depicted in FIG. 1 is that a pair of vADCs 110-1 and 110-2 are utilized for backup/failover purposes. That is, one vADC 110 serves as a backup for the other. As a result, one vADC 110 waiting for operation cannot be utilized to serve a request when additional capacity is required.

Furthermore, as the vADCs 110 are virtual instances, the hypervisor of a physical machine is required to perform additional processing tasks when handling requests and responses. That is, when traffic is load-balanced by a vADC 110, all requests and responses travel over the virtual network and via the hypervisor to the vADC 110. The limitation of conversional vADC deployment when handling east-west traffic is further demonstrated in FIGS. 2-4.

Figure 2:
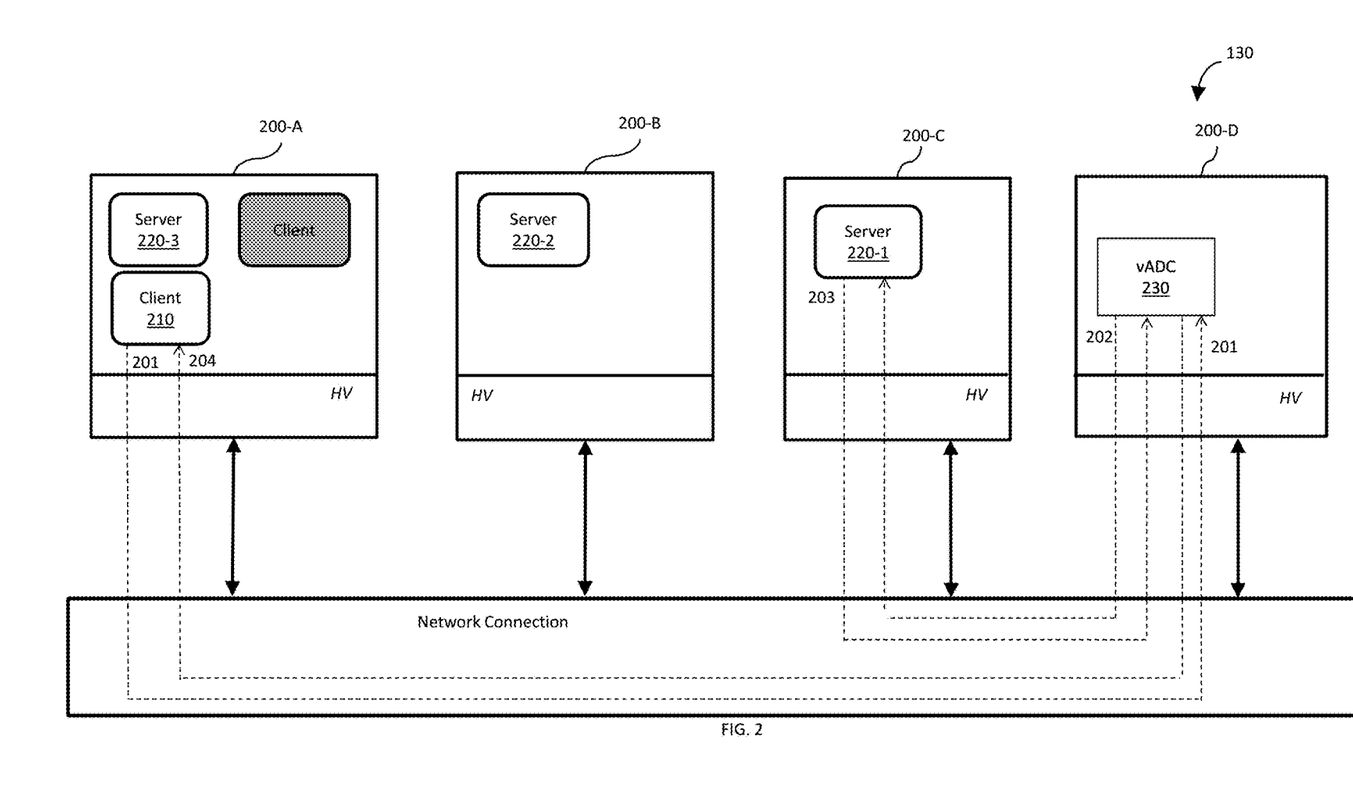
FIG. 2 is a diagram illustrating distribution of intra-tenant requests in a virtual network.

FIG. 2 illustrates distribution of east-west request from a client 210 to one of the servers 220-1 through 220-3 that are part of the same tenant within a virtual network 130. All clients and servers are virtual machines hosted in physical machines (hosts) 200-A through 200-C. In this example, the host 200-D hosts an instance of a virtual ADC (vADC) 230. An intra-tenant request (201) from a client 210 is directed to the VIP address of the vADC 230. The vADC 230 forwards the request to the server 220-1 for processing the request (202). The decision of which server 220 would serve the request is based on any known load balancing decisions. Then, the server 220-1 responds with a response (203) directed to the vADC 230, which returns the response to the requesting client 210 (204).

Thus, to serve an intra-tenant request, a hypervisor (HV) of each participating host is traversed (i.e., processing of a request/response by a hypervisor) at least one time, and a total of 4 times to complete a transaction. That is, in the above example, there are 4 "hypervisor hops" of host 200-A (1 hop), host 200-C (1 hop), and the host 200-D (2 hops). Each such hop requires forwarding and processing of packets by the hypervisor, context switching performed by the hypervisor, and so on. Further, as packets travel between hosts 200-A through 200-D, the network becomes congested as each request and response travels the virtual network twice. It should be noted that any request from any client regardless of the physical location of the client and/or server would require at least 4 hypervisor hops. For example, a request from a client 210 to the server 220-3, both residing in the same host, also requires sending the request and the corresponding response though the host 200-D.

Figure 3:
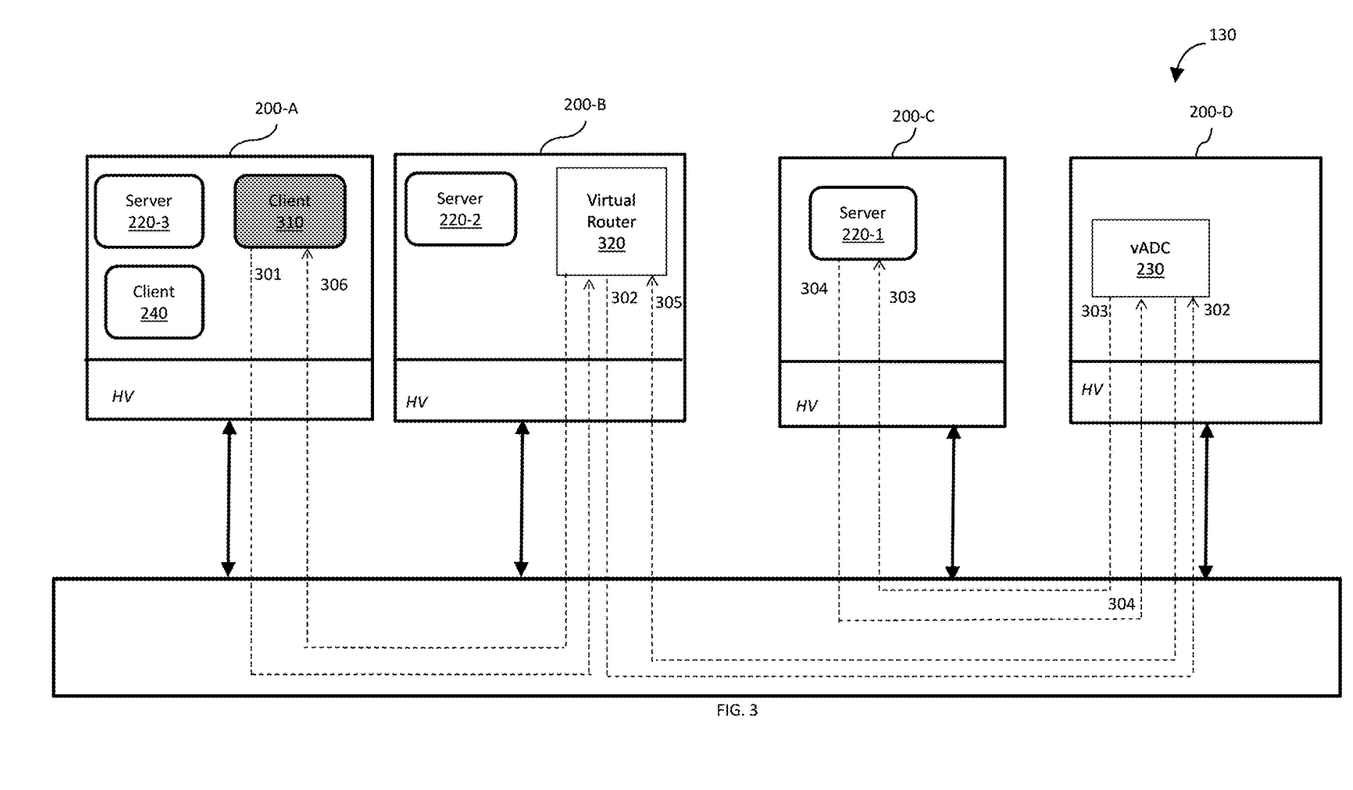
FIG. 3 is a diagram illustrating distribution of inter-tenant requests in a virtual network.

As further demonstrated in the FIG. 3, inter-tenant requests (i.e., a request from a client that resides in one tenant to a server located in another tenant) requires at least 6 hypervisor hops. In the exemplary FIG. 3, a client 310 does not belong to the tenant of the servers 220-1 through 220-3. The client 310 sends a request (301) to a service from one of the servers 220. The request is directed to a VIP address, that being the vADC 230. However, in this case, the request is first received at a virtual router 320 that resides in the host 200-B. The virtual router 320 routes the request to the vADC 230 (302), which directs the request to the server 220-1 (303). The decision which server 220 would serve the request may be based on any known load balancing decisions. Then, the server 220-1 responds with a response (304) directed to the vADC 230, which returns the response to the virtual router 320 (305). The virtual router 320 relays the response to the client 310 (306). Thus, to serve an inter-tenant request, a hypervisor of each participated host is traversed (i.e., processing of a request/response by a hypervisor) at least one time, for a total of 6 times to complete a transaction. That is, in the above example, there are 6 hypervisor-hops of host 200-A (1 hop), host 200-C (1 hop), host 200-B (2 hops), and the hypervisor of host 200-D (2 hops). In addition, each request and response travels three times over the virtual network, further reducing available bandwidth.

The virtual ADC deployments as illustrated in FIGS. 1-3 can be scaled-up, but not scaled-out. Scaling-up of performance can be achieved by using high capacity hosts that can host high capacity vADCs (having many CPU and memory resources assigned to them). Scaling-out is required to achieve higher performance above the limits that a single host machine can provide, and without using special high performance host machines. That is, in contrast to a scale-up approach, where high capacity components (which suffer from higher per-unit-of-capacity prices) are used, in a scale-out deployment, a capacity of large numbers of low-cost components is utilized. Essentially, the scale-out approach treats hardware as a resource pool from which individual components can be allocated, on-demand, to workloads without manual intervention, thus the operational costs per-unit-of-capacity are smaller relatively to those in a traditional enterprise deployment.

As the conventional vADC deployment mandates that all requests will be distributed by a central vADC (addressed by a VIP address) and further require a high number of hypervisor-hops, these deployments cannot be scaled-out efficiently. That is, the conventional vADC deployment involves a virtual IP address that clients should address requests to in order to reach a service. Therefore, a vADC is an endpoint in the virtual network, and requests should be addressed to this endpoint to access the required service. Thus, scaling out such a service is difficult as that implies using multiple instances of the vADC all sharing the same VIP. There are mechanisms to distribute network traffic (such as, e.g., equal cost multi path). However, such mechanisms impose severe limitations and cannot be efficiently used for such a purpose.

Figure 4:
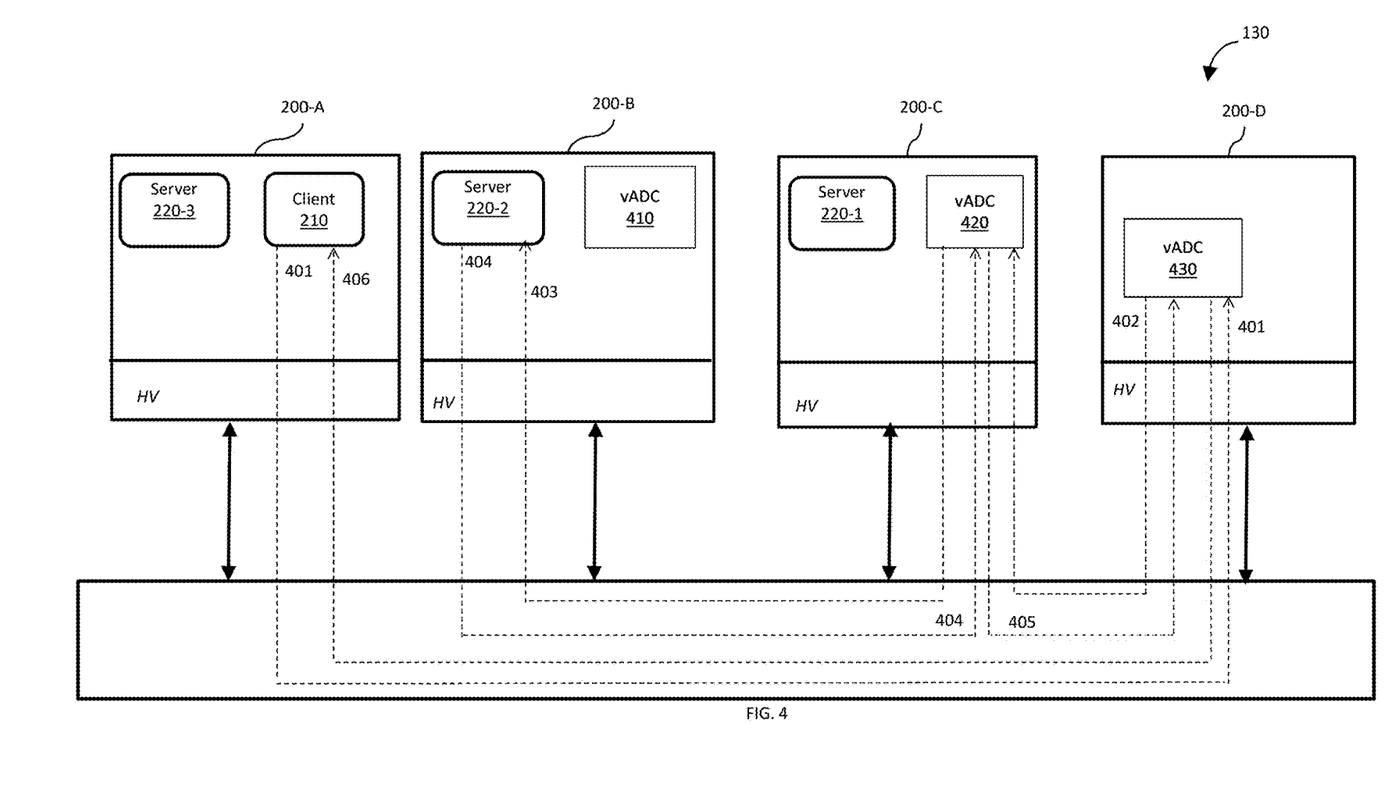
FIG. 4 is a diagram illustrating a conventional distributed virtual ADC solution.

A distributed vADC discussed in the related art suggests having a vADC with a lower capacity at some hosts in additional to a central virtual ADC that manages the overall distribution of traffic. The distributed vADC deployment is illustrated in FIG. 4. The vADCs 410, 420, and 430 are respectively hosted in hosts 200-B, 200-C, and 200-D, where vADC 430 can serve as the central traffic distribution point.

In this case, a client 210 sends a request (401) to a service from one of the servers 220. The request is directed to a VIP on vADC 430 that serves as a first distribution point. The vADC 430 directs the request to the vADC 420 (402), which directs the request to the server 220-2 in the host 200-B (403). The decision of which server 210 would serve the request is based on any known load balancing decisions. Then, the server 220-2 responds with a response (404) directed to the vADC 420, which returns the response to the vADC 430 (405). The vADC 430 relays the response to the client 210 (406).

Thus, in the distributed vADC deployment, to serve an intra-tenant request, there are at least 6 hypervisor-hops. That is, in the above example, the hypervisor of host 200-A is traversed 1 time, the hypervisor of host 200-B is traversed 1 time, the hypervisor of host 200-C is traversed 2 times, and the hypervisor of host 200-D is traversed 2 times. Thus, a sum of 6 hypervisor hops. Therefore, even by adding more vADCs to achieve a limited scale-out performance (limited by the capacity of the vADC 430), handling requests by a client requires a large number of hypervisor hops. The disadvantages of higher hypervisor-hops are discussed above. Thus, the distributed vADC deployment also requires a large number of hypervisor hops to serve a single client request and, further, the request and response travel over the network three times each.

Therefore, it would be an advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for distributing application delivery controller services in a virtual network. The method comprises activating a first application delivery controller (ADC) agent on at least a first host machine of a plurality host of machines included in the virtual network, wherein the first host machine is configured to host at least one client; intercepting, by the first ADC agent, a request from the at least one client, wherein the request is for a service provided by one server of a plurality of servers hosted by the plurality host machines; selecting, by the first ADC agent, a server of the plurality of servers to serve the request; forwarding, by the first ADC agent, the intercepted request to the selected server; and relaying a response to the intercepted request received from the selected server to the at least one client.

Certain embodiments disclosed herein also include a host machine for distributing application delivery controller services in a virtual network. The host machine comprises a processing system; and a memory coupled to the processing system, the memory containing instructions that, when executed by the processing system, configure the host machine to: activate a first application delivery controller (ADC) agent on the system, wherein the host machine is part of the virtual network containing a plurality of host machines, wherein the system is further configured to host at least one client; intercept, by the first ADC agent, a request from the at least one client, wherein the request is for a service provided by one server of a plurality of servers hosted by the plurality of host machines included in the virtual network; select, by the first ADC agent, a server of the plurality of servers to serve the request; forward, by the first ADC agent, the intercepted request to the selected server; and relay a response to the intercepted request received from the selected server to the at least one client.

Certain embodiments disclosed herein also include a datacenter configured to provide distributed application delivery (ADC) services. The datacenter comprises a network; and a plurality of host machines communicatively connected via the network, wherein each of the plurality of host machines is configured to host at least one client and at least one server, wherein each host machine hosting at least one client is further configured to: activate a first application delivery controller (ADC) agent; intercept, by the first ADC agent, a request from the at least one client, wherein the request is for a service provided by one server of a plurality of servers hosted by the plurality of host machines; select, by the first ADC agent, a server of the plurality of servers to serve the request; forward, by the first ADC agent, the intercepted request to the selected server; and relay response to the intercepted request received from the selected server to the at least one client.

BRIEF DESCRIPTION OF THE DRAWINGS

Various embodiments are particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a robust scaling-out solution of ADC services in virtualized datacenters. The disclosed solution is based on providing a small scale ADC agent, hosted in the same physical machine (host) as the clients or any other sources generating requests. The ADC agent is configured to handle all requests from local clients before such requests travel outside of the host. Thus, according to the disclosed embodiments, the load balancing decisions are performed at a close-proximity to the client (source) and not the server (destination).

As will be demonstrated below, the proposed solution allows direct communication between a client host and a server host, thereby significantly reducing the number of hypervisor hops and required network bandwidth when serving client's requests. Further, as the ADC agent performs the load balancing decisions at the source (at the host hosting the ADC agent and client), the load balancing service in the virtual network and/or datacenter can be easily scaled-out. As will be discussed in detail below, the ADC agent is part of each host's infrastructure, thus there is no need to maintain an idle ADC as a backup for each agent. This further reduces the utilization of computing resources in the datacenter.

Figure 5A:
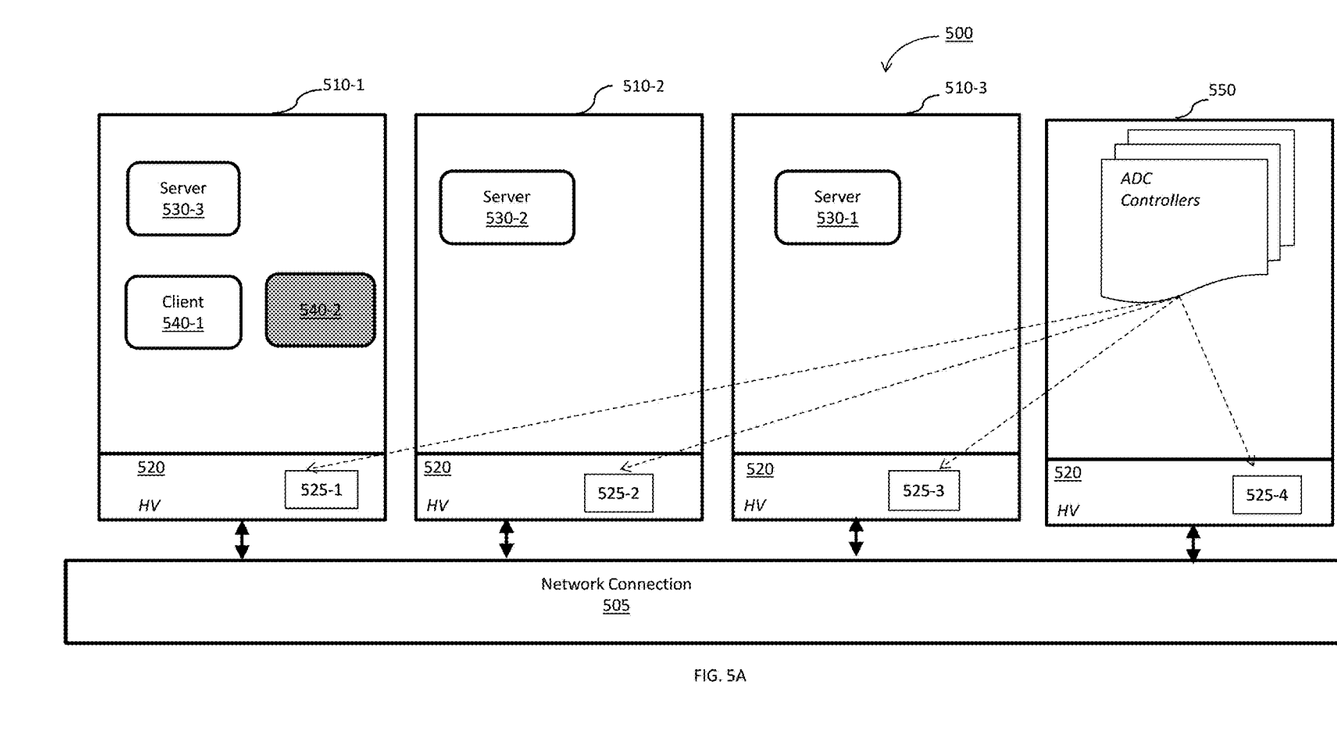
FIG. 5A is a diagram illustrating a topology of a virtual network utilized to describe the various disclosed embodiments.

FIG. 5A is an exemplary and non-limiting diagram illustrating a topology of a virtual network 500 utilized to describe the various embodiments disclosed herein. The virtual network 500 includes a plurality of physical machines (hosts) 510-1, 510-2, and 510-3 (collectively referred to hosts 510 or a host 510). A host 510 may include, for example, a server, a blade server, a blade system, a multi-device system, and a network device, such as a load balancer, an application delivery controller, and the like. The hosts 510 are communistically connected to each other through a communication link 505, which may be a wired connection, a wireless connection, or any combination thereof.

Each host 510 includes a hypervisor 520 that controls the execution of a plurality of virtual machines (VMs) hosted in a host 510. The hypervisor 520 presents the guest operating systems with a virtual operating platform and monitors the execution of the guest operating systems. The hypervisor 520 also defines the allocation of computing resources for each guest operating system. It should be appreciated that, although FIG. 5 illustrates an implementation of the virtual network 500 through hypervisors 520, the disclosed embodiments are not limited to such implementation. Specifically, the disclosed embodiments are applicable to any type of implementation of the virtual network 500. It should be further noted that a virtual machine, discussed in the context of the disclosed embodiments, include any type of virtual execution environments, such as software containers (e.g., Docker containers), and the like. It should be noted that the embodiments have been discussed herein with a reference to a specific virtual execution environment including VMs and hypervisors merely for the sake of simplicity and should not limit the scope of the various disclosed embodiments.

The VMs may include servers 530 and clients 540. A client is a consumer of a service from a server, and thus initiates requests. That is, the client 540 utilizes services from the servers 530 hosted in hosts 510. According to the disclosed embodiments, a host 510 further includes an ADC agent 525. According to some embodiments, an ADC agent can be installed, executed and/or instantiated in any host 510. In one possible deployment, an ADC agent 525 is included at least in any host hosting at least one client, e.g., host 510-1. In another possible deployment, the ADC agent 525 is included in all hosts.

In certain embodiments, the ADC agent 525 may be executable code residing in the memory (not shown) of a host 510 and executed by the processor (not shown) of the host 510. In one embodiment, the ADC agent 525 can be realized as a service or a process of a hypervisor 520. In a further embodiment, the ADC agent 525 can be realized as a service supported by an OS of a host 510. In yet another embodiment, the ADC agent 525 can be realized as a VM executed and controlled by the hypervisor 520. In another embodiment, the ADC agent 525 can be realized as a software container.

The virtual network 500 also includes an ADC controller 550 connected to the communication link 505. In an embodiment, the ADC controller 550 is implemented as a physical machine hosting a cluster of virtual instances of ADC controllers. It should be noted that the virtual instances of ADC controllers can be hosted in any host of the network 500. The ADC controller 550 provides a management interface for a user (e.g., a system administrator) for setting the various elements of the load balancing service. This includes, for example, network addresses, designation of servers 530 in hosts 510, a VIP address of ADC services, load balancing preferences, and so on. The ADC controller 550 configures various ADC agents 525 with the received settings. A user (e.g., a system administrator) can access the ADC controller 550 using, for example, a Web-based application, a SNMP-based application, a command-line interface (CLI), web services API, and the like.

The ADC controller 550 performs control-plane activities. For example, it may be further configured to collect server load and availability information for the server instances 530 and to share such information among all ADC agents 525. The load information may include the current load and health of each server 530, load (e.g., CPU, memory, bandwidth, etc.) of each host 510, and so on. Such information can be pulled by or pushed to the ADC controller 550 frequently, continuously, and/or on-demand. In one implementation, the ADC controller 550 is configured to communicate with the ADC agents 525 through an API. As another example for a control-place activity, the ADC controller 550 may interact with a Cloud Operations System, Virtual Network Management System, and the like, to extract information and monitor changes in the datacenter and/or virtual network. The extracted information can be used to automatically configure ADC agents to adapt to such a change, e.g., an instantiation of a new server VM requires update of relevant ADC agents. One of ordinary skill should be familiar with the functionality of the ADC controller.

In some configurations, according to the disclosed embodiments, the ADC agents 525 communicate the server load and availability information between themselves without involving the ADC controller.

It should be appreciated that communication between the servers 530 and the clients 540 is considered as east-west communication. However, the servers 530 in the virtual network 500 can be accessed by a client (not shown) connected outside of the virtual network 500. This would be considered as north-south communication. Such an access is enabled through a legacy external network (not shown). Examples for such networks include WAN, a LAN, the Internet, an Internet service provider (ISP) backbone, a corporate network, and the like.

The virtual network 500 is a multi-tenancy virtual network that can host clients from different tenants. As a non-limiting example, the client 540-1 may be part of a first tenant and the client 540-2 may be part of a second tenant. In this example and without limitation, the servers 530 are of the first tenant. As noted above, a "tenant" is a group of one more VMs (or containers) hosted in physical machines and provisioned to provide services to a particular customer, for example, based on a SLA.

The multi-tenancy virtual network 500 can be structured as a software defined network (SDN), an overlay network, and the like. In certain configurations, the functionality of the ADC controller 550 can be integrated in a central controller of an SDN.

It should be noted that although not shown in FIG. 5A, each host 510 includes various hardware resources. The hardware resources include, but are not limited to, one or more central processing units (CPUs), each CPU having one or more processing cores, a system memory, a storage disk, a system board, a memory management unit, registers, network ports, and so on. An operating system (OS) is also executed over the hardware resources of a host 510. The OS may be, but is not limited to, a Windows-based operating system, a Linux based operating system, a UNIX based operating system, and the like.

The various disclosed embodiments for providing distributed ADC services are realized in part by utilizing the ADC agents 525. Specifically, an ADC agent 525 (i.e., each of the ADC agents 525-1, 525-2, 525-3, and 525-4 shown in FIG. 5A) is configured to operate at each host 510 that includes at least a client 540. The ADC agent 525 is configured to intercept a request sent from a client, to select a destination server based on a load balancing decision, and to forward the request to the selected server 530. The ADC agent 525 is further configured to receive the response from the selected server, and forward the response to the client 540 sending the initial request. To this end, the ADC agent 525 is configured to intercept requests sent to a VIP address and optionally a layer 4 port associated with the ADC service provided to a tenant. In a multi-tenancy environment, an ADC agent 525 may be configured to intercept requests sent to each VIP address associated with the ADC service of each tenant in the network 500. It should be noted that an ADC agent 525 is not exposed to the network as a separate network entity with its own VIP address or any other network parameters. That is, the VIP address is not unique per each ADC agent.

The load balancing decision is based on the load of each server 530, load of the hosts 510, a proximity location of a server and a requesting client, tenants' prioritization, any combination thereof, and so on. The load information can be collected by each ADC agent 525 and shared among other ADC agents 525. Alternatively or collectively, the gathered load information can be shared by the ADC controller 550. The load information may include a CPU, memory, and/or bandwidth utilization of each concurrent active connection, a number of new connections per second, and so on. The load of a server 530 can be determined, for example, based on the number of current sessions, the number of active processing tasks, and the like. A load balancing decision based on the load information may include, for example, selecting the least load host and/or server, the closest server with a load less than a predefined threshold, and so on.

The load information can also include proximity information measured by each ADC agent 525. The proximity information may include, for example, the round-trip time (RTT) of packets between two hosts. A load balancing decision based on the proximity information may include, for example, selecting the host with the shortest number of router hops from the client host. Tenants' prioritization may be based on, for example, SLA assigned to each tenant. For example, if clients 540-1 and 540-2 from different tenants request for a service, then the client 540-1 may be prioritized over client 540-2 based on the tenant's SLA.

Figure 5B:
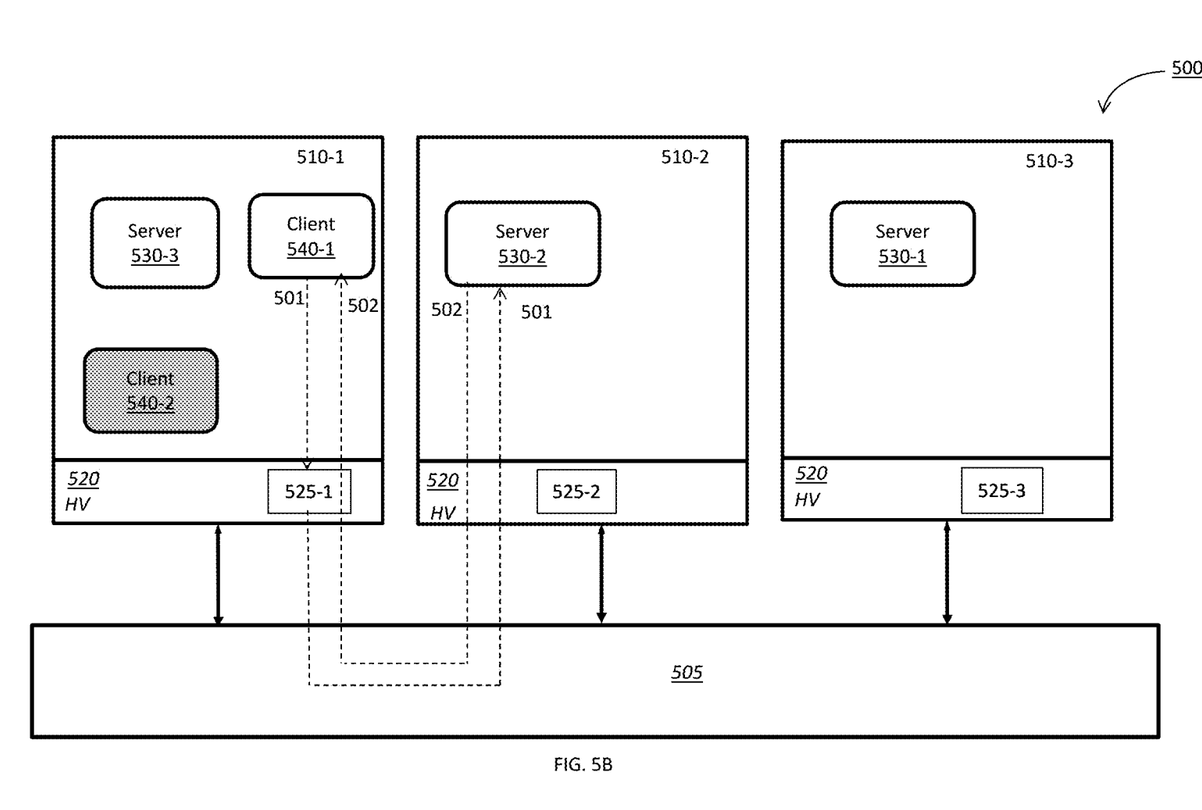
FIG. 5B is a diagram illustrating the distribution of intra-tenant requests in a virtual network according to an embodiment.

Referring now to FIG. 5B, which demonstrates the operation of an ADC agent (e.g., agent ADC agent 525-1) when handling intra-tenant requests according to the disclosed embodiments. An intra-tenant request from a client is served by a server belongs to the same tenant as the requesting client. It should be noted that the ADC controller 550 is not shown in FIG. 5B, as the controller 550 does not participate in the data-plane operation of the ADC agent 525.

As illustrated in FIG. 5B, a request (501) from the client 540-1 is intercepted by the ADC agent 525-1. Typically, such a request is directed to a VIP address and optionally layer-4 port associated with an ADC service. The ADC agent 525-1 is then configured to select one server out of the servers 530 to serve the request. Then, the request is sent from the ADC agent 525-1 to the selected server, in this example, the server 530-2. The server 530-2 sends a response (502) to the request to the client 540-1 via ADC agent 525-1. Thus, by handling the load balancing locally in the host where the client resides, the number of hypervisor hops is reduced. In this example, there are only 2 hypervisor hops of hypervisors 520 of host 510-1 and 510-2, and the request and response travel just once over the network.

It should be noted that as the ADC agents 525 intercept the client's requests for the VIP address locally where the client resides, this allows distribution of the request to a server hosted in the same host as the client when such a server is available. Therefore, the requests/responses will not travel on the network (through the communication link 505) to a different host, thereby further reducing the network bandwidth utilization. For example, a request from the client 540-1 is intercepted at the ADC agent 525-1, which distributes the request to the server 530-3. The server 530-3 sends a response to the client 540-1 via the ADC agent 525-1 and the entire transaction is completed without exiting the host 510-1.

Optionally, the ADC agent 525-1 establishes a TCP connection with the client upon intercepting the request and establishes a new TCP connection between itself and the selected server.

It should be noted that any request prior to its interception by the respective ADC agent may traverse a router (not shown) and/or a firewall (not shown) executed in or by the hypervisor 520 of the respective host.

Figure 6:
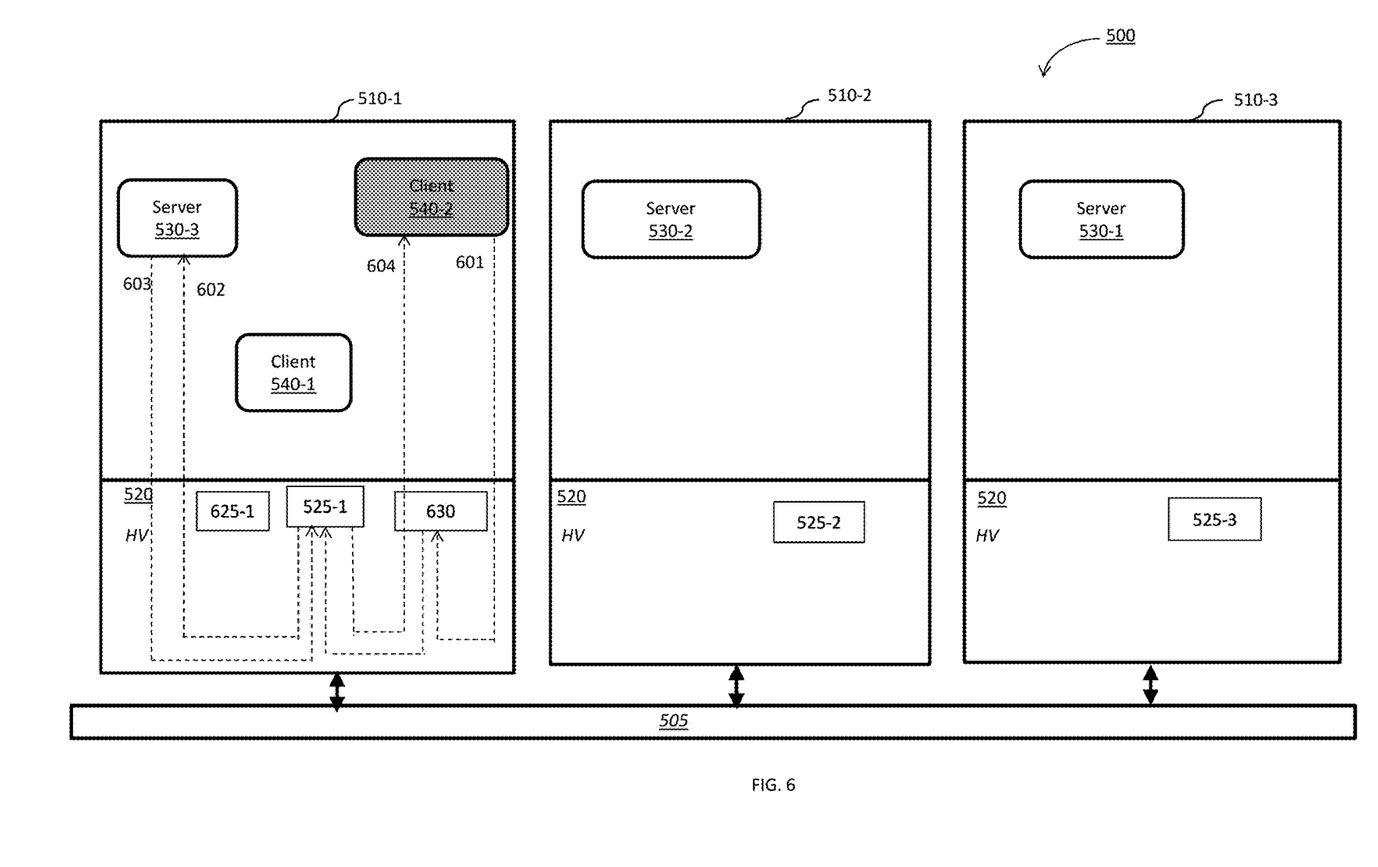
FIG. 6 is a diagram illustrating the distribution of inter-tenant requests in a virtual network according to an embodiment.

As further demonstrated in FIG. 6, the disclosed distributed ADC solution can further improve efficiency when handling inter-tenant requests. As noted above, an inter-tenant request is sent from a client residing in a one tenant to a server located in another tenant.

In the exemplary FIG. 6, the client 540-2, which is part of the second tenant requests a service from a server 530 that belongs to the first tenant. The ADC agent 525-1 is configured to intercept requests directed to a VIP address of the first tenant and a VIP of the second tenant. In certain implementations, each host having clients from different tenants is configured to include a single ADC agent from each tenant. In the example shown in FIG. 6, the ADC agent 525-1 is configured to support the first tenant, while the ADC agent 625-1 is configured to support the second tenant. In such an implementation, a request (601) from a client 540-2 belongs to the second tenant is routed from the second tenant to the first tenant network via a distributed router and firewall (both functions/appliances are labeled as 630 in FIG. 6) that are allowed to transfer packets between tenants. Then it is intercepted by the ADC agent 525-1, which selects the server 530-3 from the first tenant to handle the request (602).

The response (603) from the server 530-3 is sent back to the client 540-2 through first the ADC agent 525-1, and then the firewall and router (collectively shown as an element 630) to the client 540-2 (as a response 604). It should be noted that, in the example, the requests (601, 602) and responses (603, 604) do not travel though the communication link 505, but rather are sent/received internally within the host 510-1. That is, performing the balancing decisions by an ADC agent resides in the host as the client allows to optimal path for serving the requests, while minimizing the number of hypervisor hops.

That is, as demonstrated in FIG. 6, the ADC agent 525-1 can be configured to support of multi-tenancy handling of requests. In such a configuration, when handling inter-tenant requests by the ADC agent 525, only 2 hypervisor hops are required.

In certain embodiments, the ADC agent 525 is installed, activated, instantiated or otherwise configured on-demand when a client is being executed on a host and/or when resource sharing is required as explained below. The fact that the ADC agent 525 can be operable on-demand without any prolonged setup time eliminates the need to maintain a backup ADC agent. It should be noted that, as the ADC agent deployment is fully distributed, when one host and/or ADC agent becomes inactive the other hosts and/or ADC agents can continue to handle their clients' requests without interruption. In certain configurations, hosts without any clients do not include any operational ADC agents. When a client is instantiated on such a host, an ADC agent 525 is installed, activated, or otherwise instantiated. It should be emphasized that the ADC agent 525 can be operable in a host without any clients.

In one embodiment, ADC agents operable in a host without any clients or with a lower number of clients can be utilized for resource sharing. Typically, such ADC agents will be less loaded and, therefore, will have available resources to assist more loaded ADC agents.

Figure 7:
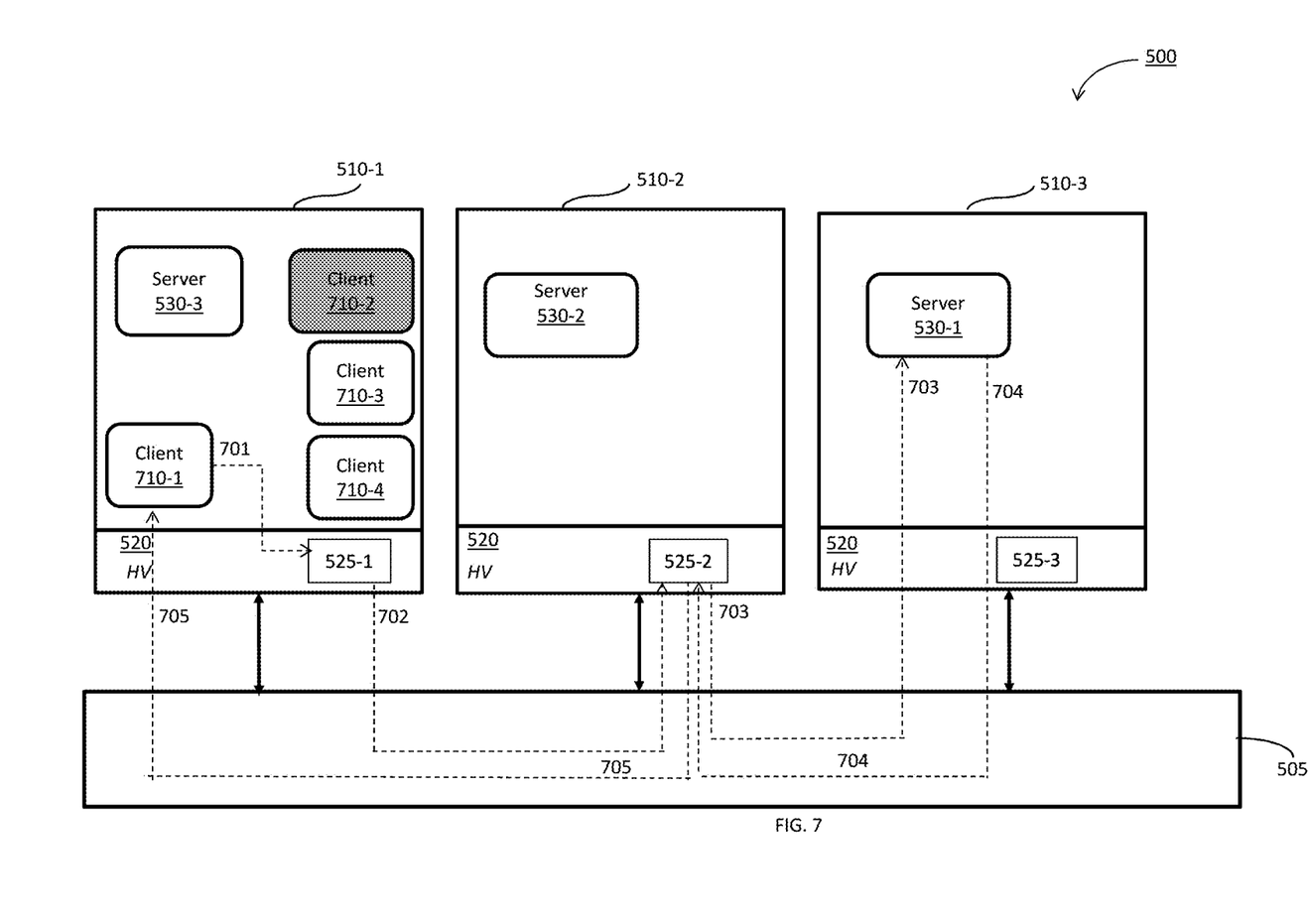
FIG. 7 is a diagram illustrating the resource sharing of virtual ADC agents according to an embodiment.

As illustrated in the exemplary and non-limiting FIG. 7, the host 510-1 is too loaded with handling 4 clients 710-1 through 710-4, while hosts 510-2 and 510-3 do not include any clients. In certain configurations, the hosts 510-2 and 510-3 may be less loaded and/or include unique processing capabilities, such as SSL/TLS offloading. To efficiently handle requests from clients 710-1 through 710-4, some of the requests, intercepted by the agent 525-1, are transferred to ADC agents 525-2 and/or 525-3. As an example, this may be required when the ADC agent is configured to perform SSL/TLS handshake with the client prior to making a load balancing decision. This is a CPU-intensive task that may overload the CPU of the host 510-1. As a result, it would be beneficial to hand over some or all of the SSL/TLS functionality to an ADC agent on a less loaded or a specialized host.

In the example shown in FIG. 7, a request (701) from a client 710-1 is intercepted by the ADC agent 525-1 and forwarded (702) to the ADC agent 525-2, because ADC agent 525-1 is overloaded. The ADC agent 525-2 selects the server 530-1 to serve the request, and forwards the request (703) to the server 530-1. The server 530-1 then sends a response (704) to the ADC agent 525-2, which relays the response (705) directly to the client 710-1.

It should be noted that other off-load optimization as would be apparent to one or ordinary skill in the art may be utilized without departing from the scope of the disclosure. For example, an ADC agent 525-1 can be configured to choose an offload ADC agent that resides on a host together with a server 530. In the above example, the ADC agent 525-2 can be configured to distribute the load, by forwarding the request to the server 530-2 and not to the server 530-1. This would further reduce the hypervisor hops and network bandwidth usage.

It should be noted that the operation of the ADC agent 525 is not limited to load balancing of traffic. Each ADC agent 525 can perform the tasks including, but not limited to, traffic acceleration, traffic compression, traffic caching, SSL offloading, application-layer processing (such as, WAF processing, content filtering, etc.), and so on. The ADC agent 525 may be further configured to perform tasks related to traffic steering and/or service function chaining. Examples to such tasks can be found in U.S. patent application Ser. No. 14/743,229 to Rochwerger, et al. assigned to the common assignee, and is hereby incorporated by reference for all that it contains.

Figure 8:
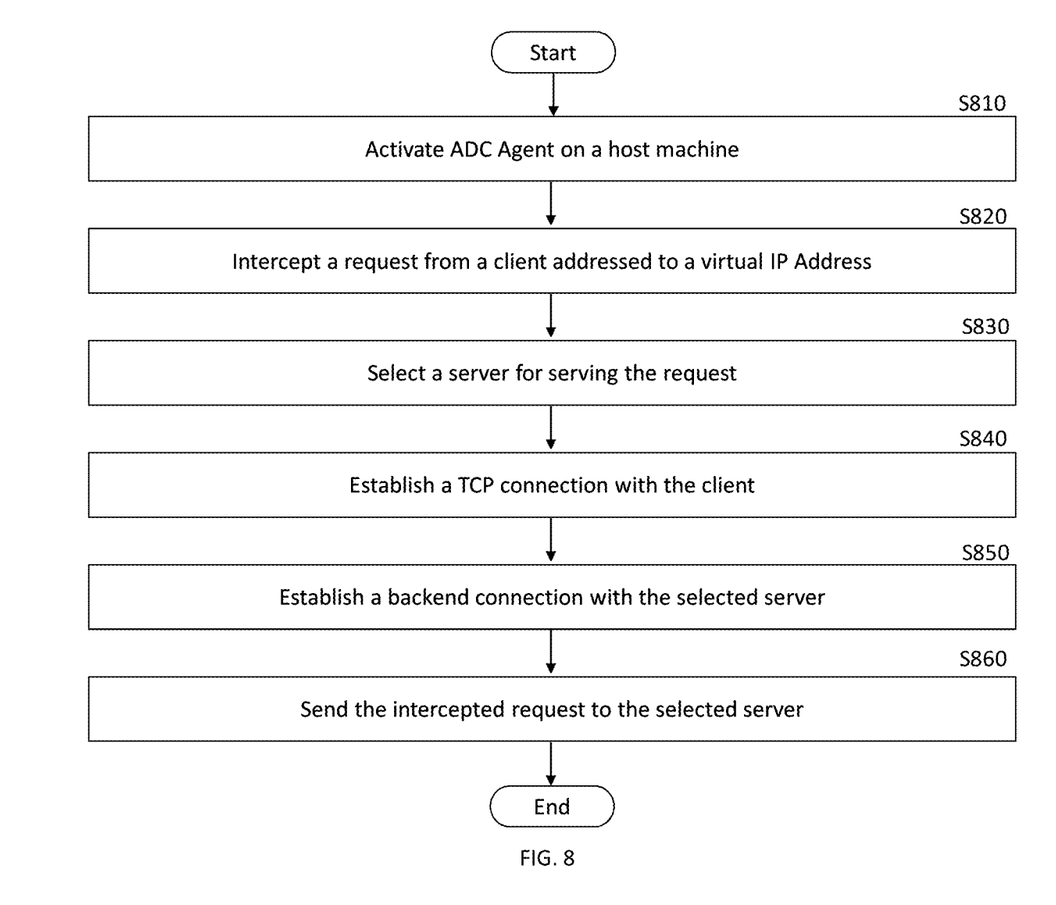
FIG. 8 is a flowchart illustrating the operation of an ADC agent.

FIG. 8 shows a non-limiting and exemplary flowchart 800 illustrating the operation of an ADC agent for handling east-west traffic according to one embodiment. An east-west traffic includes traffic between a client and server within a virtual network. The client may be of the same or a different tenant as the destination server.

At S810, the ADC agent is activated on a host device including at least one client. A client is a VM residing in the same host hosting the ADC agent. The activation of the ADC agent may be performed on-demand, for example, by a system administrator in response to receiving a request form a client or intercepting some requests, and so on. In certain implementations, activation of the ADC agent may include installing, executing, and/or instantiating an ADC agent in the host. As noted above, the ADC agent may be executable code residing in the memory (not shown) of a host and executed by the processor (not shown) of the host. In certain embodiments, the ADC agent can be realized as a service or a process of a local hypervisor, a service supported by an OS of a host, a VM executed in the host controlled by the local hypervisor, or a software container controlled by the local host kernel. It should be emphasized that an instance of an ADC agent is always activated at the same host when there is at least one active instance of the client. Thus, the requests from such a client are handled locally.

At S820, a request from a client addressed to a VIP address is intercepted. The request may be an intra-tenant or inter-tenant request. In some configurations, S820 is performed prior to on-demand activation of ADC agent (at S810).

At S830, a server for serving the intercepted request is selected. The selection is based on a load balancing decision. The decision can be taken respective of load information, proximity information, tenant's provisioning, and the like. Various examples for the selection of the server are provided above. In a preferred embodiment, a server residing in the same host as the client is selected. It should be noted that the selected server may be of the same tenant or a different tenant of the client sending the request.

At S840, a TCP connection with the client is established. At S850, a backend connection is established with the selected server. In an embodiment, S840 and S850 are optional. In a further embodiment, S850 is performed prior to S840.

At S860, packets of the intercepted request are sent to the selected server. The selected server, upon processing the request, responds to the client via the ADC agent.

In certain embodiments, an ADC agent is also configured to periodically report its load, the selected servers, its host load, and/or health checks of servers to the ADC controller (e.g., controller 550) and/or other ADC agents hosted by different hosts. In another embodiment, the ADC agent executed on the host where server VMs are running, can collect load and health information of the server instances from the local hypervisor and report that information to the ADC controller and/or other ADC agents.

The operation of the disclosed embodiments and specifically the ADC agents, as discussed above, refers to a case in which the intercepted request is from a client resides in the same host as the ADC agent. However, the ADC agents, disclosed herein, can be also configured to handle requests for ADC services received from a client connected outside the virtual network (and the hosts). Typically, such an "external" client is connected to the virtual network through an external network, and the communication refers to as north-south traffic direction.

Figure 9:
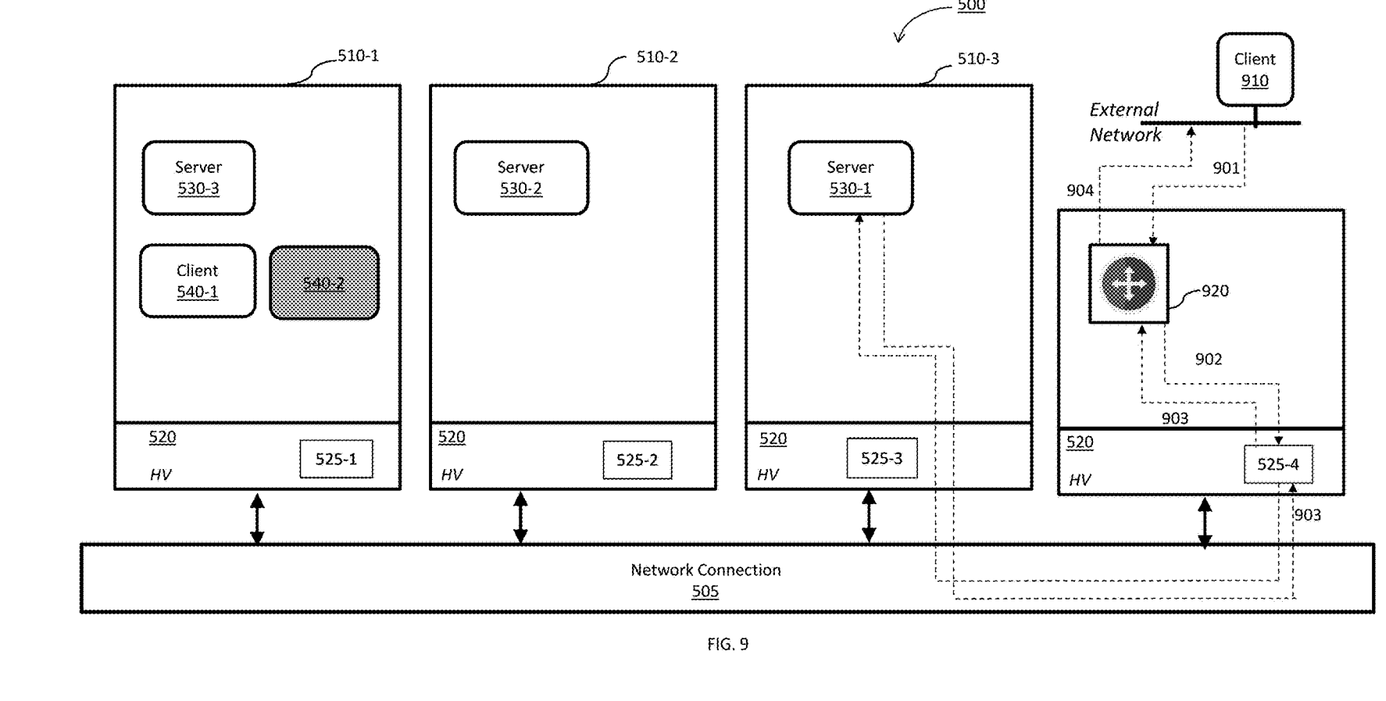
FIG. 9 is a diagram illustrating the distribution of "north-south" requests in a virtual network according to an embodiment.

According to this embodiment, shown in FIG. 9, a request (901) from an external client 910 is to a VIP address outside of the virtual network. A network device 920, connected at the perimeter of the virtual network, typically performs, among other tasks, network address translation (NAT) on incoming requests (traffic) to translate the external VIP address to an internal VIP address (an address within the virtual network).

The request (902), now directed to an internal VIP address, is captured by one of the ADC agents 525 operable in the hosts of the virtual network 500. In the example illustrated in FIG. 9, the request 902 is captured by the ADC agent 525-4. Any ADC agent (and the agent that captured the request) is configured to establish a TCP connection with the external client, to select one server (e.g., server 530-1 residing in a host (e.g., host 510-3) of the virtual network to serve the request, to receive a response (e.g., response 903) from such a server, and to forward the received response to the network device 920. The network device 920 would perform a reverse a NAT operation and send the response (904) back to the external client 910.

In an embodiment, such network device is realized as one or more virtual machines hosted in one or more hosts of the virtual network. In another embodiment, that network device is implemented as a dedicated (physical) server and is not a virtual machine. In a preferred embodiment, an instance of the network (NAT) device 920 that received the external request (to an external VIP) and an ADC agent capturing the respective internal request (to an internal VIP) both reside in the same host. In this embodiment, the requests can be served by traversing just two hypervisors on the virtual network.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

While the disclosed embodiments been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing describes the disclosure in terms of embodiments foreseen by the inventor for which an enabling description was available, notwithstanding that insubstantial modifications of the disclosed embodiments, not presently foreseen, may nonetheless represent equivalents thereto.

What is claimed is:

1. A method for distributing application delivery controller services in a virtual network, comprising:
    activating a first application delivery controller (ADC) agent on at least a first host machine of a plurality of host machines included in the virtual network, wherein the first host machine is configured to host at least one client;
    intercepting, by the first ADC agent, a request from the at least one client, wherein the request is for a service provided by one server of a plurality of servers hosted by the plurality of host machines wherein the at least one client hosted by the first host machine on which the ADC agent is also hosted is a consumer of the service provided by the server in response to the client-initiated request for service;
    selecting, by the first ADC agent, a server of the plurality of servers to serve the request;
    forwarding, by the first ADC agent, the intercepted request to the selected server; and
    relaying a response to the intercepted request received from the selected server to the at least one client.

2. The method of claim 1, wherein the at least one client belongs to a same tenant as the selected server.

3. The method of claim 1, wherein the at least one client belongs to a different tenant than the selected server.

4. The method of claim 3, wherein the request from the at least one client that belongs to the different tenant is forwarded to the first ADC agent via a router and a firewall.

5. The method of claim 1, wherein the activation of the first ADC agent is performed on-demand, wherein the activation includes configuration of the first ADC agent.

6. The method of claim 1, further comprising:
    activating a second ADC agent on a second host machine; and
    distributing requests from the first ADC agent to the second ADC agent to control a load on the first ADC agent.

7. The method of claim 1, further comprising:
    collecting load information on each server hosted by the plurality of host machines; and
    sharing the collected load information among all ADC agents activated in the plurality of host machines.

8. The method of claim 7, wherein the selection of the server is based in part on the collected load information.

9. The method of claim 1, wherein the selected server is hosted in the first host machine.

10. The method of claim 1, wherein the request sent from the client is part of an east-west traffic flow.

11. The method of claim 1, wherein the request is for any of: traffic load balancing, traffic acceleration, traffic compression, traffic caching, cryptographic protocol offloading, and application-layer processing.

12. The method of claim 1, wherein any ADC agent activated in one of the plurality of host machines is any of: a process of a hypervisor executed in the host machine, a virtual machine controlled by the hypervisor; a service supported by an operating system of the host machine, and a software container.

13. The method of claim 1, wherein the request from the at least one client is originally addressed to a virtual IP address on the virtual network configured to provide ADC services.

14. The method of claim 1, wherein selecting the server further comprises:
    establishing a network connection with the at least one client; and
    establishing a backend network connection between the first ADC agent and the selected server.

15. The method of claim 1, wherein a second request is sent from a second client external to the virtual network and is part of a north-south traffic flow.

16. The method of claim 15, wherein the second request sent from the second client external to the virtual network is translated to an internal request and captured by the first ADC agent.

17. A non-transitory computer readable medium having stored thereon instructions for causing one or more processing units to execute the method according to claim 1.

18. A host machine for distributing application delivery controller services in a virtual network, comprising:
    a processing system; and
    a memory coupled to the processing system, the memory containing instructions that, when executed by the processing system, configure the host machine to:
    activate a first application delivery controller (ADC) agent on the system, wherein the host machine is part of the virtual network containing a plurality of host machines, wherein the system is further configured to host at least one client;
    intercept, by the first ADC agent, a request from the at least one client, wherein the request is for a service provided by one server of a plurality of servers hosted by the plurality of host machines included in the virtual network wherein the at least one client hosted by the first host machine on which the ADC agent is also hosted is a consumer of the service provided by the server in response to the client-initiated request for service;
    select, by the first ADC agent, a server of the plurality of servers to serve the request;
    forward, by the first ADC agent, the intercepted request to the selected server; and
    relay a response to the intercepted request received from the selected server to the at least one client.

19. The host machine of claim 18, wherein the at least one client belongs to a same tenant as the selected server.

20. The host machine of claim 18, wherein the at least one client belongs to a different tenant than the selected server.

21. The host machine of claim 20, wherein the request from the at least one client that belongs to the different tenant is forwarded to the first ADC agent via a router and a firewall.

22. The host machine of claim 18, wherein the activation of the first ADC agent is performed on-demand, wherein the activation includes configuration of the first ADC.

23. The host machine of claim 18, wherein the host machine is further configured to:
  distribute requests from the first ADC agent to a second ADC agent activated on a different host machine of the plurality of host machines.

24. The host machine of claim 18, wherein the host machine is further configured to:
  collect load information on each server hosted by the plurality of host machines; and
  share the collected load information among all ADC agents activated in the plurality of host machines.

25. The host machine of claim 24, wherein the selection of the server is based in part on the collected load information.

26. The host machine of claim 18, wherein the selected server is hosted in the host machine.

27. The host machine of claim 18, wherein the request sent from the client is part of an east-west traffic flow.

28. The host machine of claim 18, wherein the request is for a service including any of: traffic load balancing, traffic acceleration, traffic compression, traffic caching, cryptographic protocol offloading, and application-layer processing.

29. The host machine of claim 18, wherein the first ADC agent is any of: a process of a hypervisor executed in the host machine, a virtual machine controlled by the hypervisor; a service supported by an operating system of the host machine, and a software container.

30. The host machine of claim 18, wherein the request from the at least one client is originally addressed to a virtual internet protocol address on the virtual network configured to provide ADC services.

31. The host machine of claim 18, wherein the host machine is further configured to:
  establish a network connection with the at least one client; and
  establish a backend network connection between the first ADC agent and the selected server.

32. The host machine of claim 18, wherein a second request sent from a second client is external to the virtual network and is part of a north-south traffic flow.

33. The host machine of claim 18, the second request sent from the second client external to the virtual network is translated to an internal request and captured by the ADC agent.

34. A datacenter configured to provide distributed application delivery controller (ADC) services, comprising:
  a network; and
  a plurality of host machines communicatively connected via the network, wherein each of the plurality of host machines is configured to host at least one client and at least one server, wherein each host machine hosting at least one client is further configured to:
  activate a first application delivery controller (ADC) agent;
  intercept, by the first ADC agent, a request from the at least one client, wherein the request is for a service provided by one server of a plurality of servers hosted by the plurality of host machines wherein the at least one client hosted by the first host machine on which the ADC agent is also hosted is a consumer of the service provided by the server in response to the client-initiated request for service;
  select, by the first ADC agent, a server of the plurality of servers to serve the request;
  forward, by the first ADC agent, the intercepted request to the selected server; and
  relay a response to the intercepted request received from the selected server to the at least one client.

35. The datacenter of claim 34, wherein the network is a virtual network.

36. The datacenter of claim 34, wherein the virtual network is at least a software defined network (SDN).

37. The datacenter of claim 34, where each of the plurality of host machines is further configured to activate an ADC agent on-demand, wherein the activation includes configuration of the first ADC.

38. The datacenter of claim 34, wherein any ADC agent activated in a host machine is any of: a process of a hypervisor executed in the host machine, a virtual machine controlled by the hypervisor; a service supported by an operating system of the host machine, and a software container.

39. The datacenter of claim 34, wherein the ADC services include any of: traffic load balancing, traffic acceleration, traffic compression, traffic caching, cryptographic protocol offloading, and application-layer processing.

* * * * *